E. K. Wood,
Scrub Brush.
No. 106,644. Patented Aug. 23, 1870.

Witnesses.
Philip C Dieterich
Gustave Dieterich

Inventor:
E. K. Wood
Per Munn & Co
Attorneys.

United States Patent Office.

EUGENE KINCAID WOOD, OF DE WITT, IOWA.

Letters Patent No. 106,644, dated August 23, 1870.

IMPROVEMENT IN COMBINED SCRUBBING-BRUSH, &c.

The Schedule referred to in these Letters Patent and making part of the same.

*To all whom it may concern:*

Be it known that I, EUGENE KINCAID WOOD, of De Witt, in the county of Clinton and State of Iowa, have invented a new and useful Improvement in Combination Scrub-Brush; and I do hereby declare that the following is a full, clear, and exact description thereof, which will enable others skilled in the art to make and use the same, reference being had to the accompanying drawing forming part of this specification.

This invention relates to a new and useful improvement in a scrub-brush, with which is combined a water-can and rubber drier or wiper, the head to which the brush, water-can, and drier are attached having a handle with curved shank and a swivel connection, as will be hereinafter more fully described.

In the accompanying drawing—

Similar letters of reference indicate corresponding parts.

Figure 1:
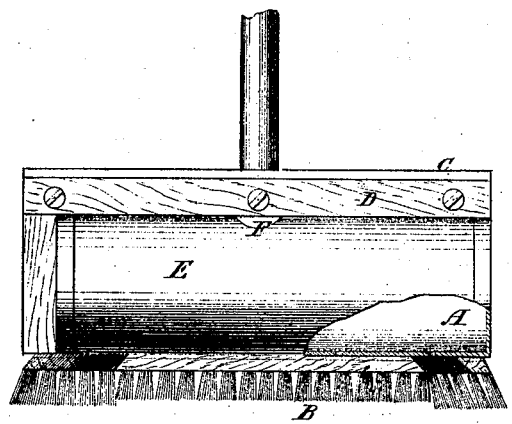
Figure 1 represents a side view, partly in section.
Figure 2:
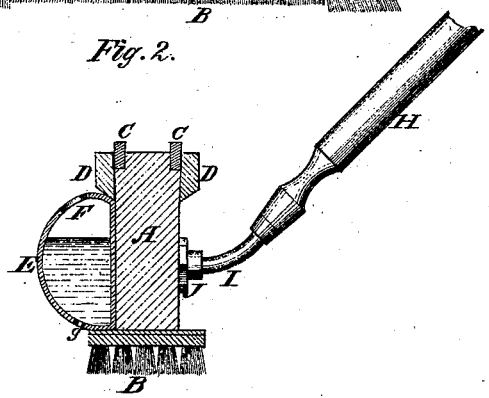
Figure 2 is a cross-section, showing the combined parts in their proper positions.

A represents the head, to one edge of which the brush B is attached by means of screws, or in any suitable manner.

C C are two strips of rubber, which are fastened in rebates in the sides of the head by the cleats D D.

E is a water-vessel, of semicircular or other form, which is securely fastened to the side of the head, having an orifice, F, for the introduction of water, and perforations, g, through its lower side, for the discharge of the water while the brush is being used.

H is the handle, with a crooked or curved shank, I, which is connected to the head by a swivel-joint, J, so that the handle may be turned in any direction, and either the brush or wiper be used with the handle in a convenient position.

By this arrangement the brush may be used and the floor scrubbed to the best advantage. The water will waste away through the perforations as it is wanted to moisten the floor. When the scrubbing is completed, the head is turned over, and the drier or wiper is used until the work is completed.

The advantages of this combined scrubber are many, and must be obvious to all.

Having thus described my invention,

I claim as new and desire to secure by Letters Patent—

The combination and arrangement of the brush B, driers C, more or less in number, water-can E, head A, and handle H with the curve I and swivel-joint J, substantially as and for the purposes shown and described.

The above specification of my invention signed by me this 8th day of July, 1870.

EUGENE KINCAID WOOD.

Witnesses:
JAMES M. NORRIS,
JAMES E. STEELE.